United States Patent
Bhave et al.

(10) Patent No.: US 12,061,675 B1
(45) Date of Patent: Aug. 13, 2024

(54) DOCUMENT CLUSTERING BASED UPON DOCUMENT STRUCTURE

(71) Applicant: Cognistic, LLC, Gibsonia, PA (US)

(72) Inventors: Roshan Bhave, Pittsburgh, PA (US);
Sanjay Chopra, Gibsonia, PA (US);
Eric Nyberg, Pittsburgh, PA (US);
Longxiang Zhang, Pittsburgh, PA (US);
Ihor Markevych, Pittsburgh, PA (US)

(73) Assignee: COGNISTIC, LLC, Gibsonia, PA (US)

( * ) Notice: Subject to any disclaimer, the term of this patent is extended or adjusted under 35 U.S.C. 154(b) by 282 days.

(21) Appl. No.: 17/496,485

(22) Filed: Oct. 7, 2021

(51) Int. Cl.
| | | |
|---|---|---|
| *G06K 9/00* | (2022.01) |
| *G06F 18/214* | (2023.01) |
| *G06F 18/23213* | (2023.01) |
| *G06N 20/00* | (2019.01) |
| *G06V 30/18* | (2022.01) |
| *G06V 30/413* | (2022.01) |

(52) U.S. Cl.
CPC ...... *G06F 18/23213* (2023.01); *G06F 18/214* (2023.01); *G06N 20/00* (2019.01); *G06V 30/18* (2022.01); *G06V 30/413* (2022.01)

(58) Field of Classification Search
CPC ............................. G06V 30/18; G06V 30/413
See application file for complete search history.

(56) References Cited

U.S. PATENT DOCUMENTS

| | | | | |
|---|---|---|---|---|
| 10,872,236 B1 * | 12/2020 | Elor | ................... | G06V 30/1452 |
| 2016/0004701 A1 * | 1/2016 | Kim | ........................ | G06F 16/35 |
| | | | | 707/750 |
| 2016/0307033 A1 * | 10/2016 | Atroshchenko | .... | G06V 30/2445 |

(Continued)

FOREIGN PATENT DOCUMENTS

KR           101494795 B1 *   2/2015

OTHER PUBLICATIONS

Unsupervised Machine Learning based Documents Clustering in Urdu, Atta Ur Rahman et al., EAI.EU, 2018, pp. 1-13 (Year: 2018).*

(Continued)

*Primary Examiner* — Jayesh A Patel
(74) *Attorney, Agent, or Firm* — FERENCE & ASSOCIATES LLC

(57) ABSTRACT

One embodiment provides a method for clustering documents based upon a structure of each of the documents, including: receiving, at a device utilizing the machine-learning model, at least one document, each including a plurality of characters and having a structure; converting, for each of the at least one document, each of the plurality of characters to one of a plurality of character representations, wherein the converting includes identifying an attribute of a character and selecting a character representation corresponding to the attribute; producing at least one array for each of the one or more documents, wherein the at least one array includes the plurality of characters converted to the character representations; and clustering the at least one document into document clusters having similar structures by grouping the at least one arrays into groups of arrays having similarities, wherein each document cluster include documents corresponding to the arrays within one of the groups of arrays.

20 Claims, 5 Drawing Sheets

(56) References Cited

U.S. PATENT DOCUMENTS

| | | | |
|---|---|---|---|
| 2017/0004208 A1* | 1/2017 | Podder | G06F 40/30 |
| 2017/0132206 A1* | 5/2017 | Kumagai | G06F 16/322 |
| 2019/0179796 A1* | 6/2019 | Lakhman | G06N 3/08 |
| 2019/0294681 A1* | 9/2019 | Walker | G06F 16/313 |
| 2021/0011124 A1* | 1/2021 | Rittberg | G01S 7/414 |
| 2021/0150284 A1* | 5/2021 | Chiang | G06N 3/045 |
| 2022/0180113 A1* | 6/2022 | Patel | G06V 10/28 |
| 2022/0301330 A1* | 9/2022 | Shoji | G06V 30/19107 |
| 2022/0318202 A1* | 10/2022 | Jha | G06F 9/542 |

OTHER PUBLICATIONS

Documents Clustering techniques, Łukasz Machnik, UMCS, 2004, pp. 401-411 (Year: 2004).*

A clustering study of a 7000 EU document inventory using MDS and SOM, Patrick A. De Mazière et al., Elsevier, 2011, pp. 8835-8849 (Year: 2011).*

* cited by examiner

```
Dmkl Fead,

I kjop msak
mlkaefs inkls
wks inal.

Hwil,
Kfj
```

DOCUMENT CLUSTERING BASED UPON DOCUMENT STRUCTURE

BACKGROUND

Grouping documents into groups or clusters can be beneficial and useful in many different applications. For example, document clusters can be used in the training of machine-learning models that classify documents in an unsupervised manner. As another example, document clusters can be used to identify when new documents are missing content. Generally, creating document clusters includes identifying the content within a document and then classifying the document as a particular document type based upon the content. The content can provide details about what is included in the document and therefore, the document type. For example, a letter may have content that would not be found within a technical document, thereby allowing for classification of the documents into different clusters.

BRIEF SUMMARY

In summary, one aspect provides a method for clustering documents based upon a structure of each of the documents, including: receiving, at a device utilizing the machine-learning model, at least one document, each including a plurality of characters and having a structure; converting, for each of the at least one document, each of the plurality of characters to one of a plurality of character representations, wherein the converting includes identifying an attribute of a character and selecting a character representation corresponding to the attribute; producing at least one array for each of the one or more documents, wherein the at least one array includes the plurality of characters converted to the character representations; and clustering the at least one document into document clusters having similar structures by grouping the at least one arrays into groups of arrays having similarities, wherein each document cluster include documents corresponding to the arrays within one of the groups of arrays.

Another aspect provides an information handling device for clustering documents based upon a structure of each of the documents, including: a processor; a memory device that stores instructions executable by the processor to: receive, at a device utilizing the machine-learning model, at least one document, each including a plurality of characters and having a structure; convert, for each of the at least one document, each of the plurality of characters to one of a plurality of character representations, wherein the converting includes identifying an attribute of a character and selecting a character representation corresponding to the attribute; produce at least one array for each of the one or more documents, wherein the at least one array includes the plurality of characters converted to the character representations; and cluster the at least one document into document clusters having similar structures by grouping the at least one arrays into groups of arrays having similarities, wherein each document cluster include documents corresponding to the arrays within one of the groups of arrays.

A further aspect provides a product for clustering documents based upon a structure of each of the documents, including: a storage device having code stored within, the code being executable by a processor and including: code that receives, at a device utilizing the machine-learning model, at least one document, each including a plurality of characters and having a structure; code that converts, for each of the at least one document, each of the plurality of characters to one of a plurality of character representations, wherein the converting includes identifying an attribute of a character and selecting a character representation corresponding to the attribute; code that produces at least one array for each of the one or more documents, wherein the at least one array includes the plurality of characters converted to the character representations; and code that clusters the at least one document into document clusters having similar structures by grouping the at least one arrays into groups of arrays having similarities, wherein each document cluster include documents corresponding to the arrays within one of the groups of arrays.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4A illustrates an example of a document received at the system.

FIG. 4B illustrates an example of the document of FIG. 4A converted to character representations.

DETAILED DESCRIPTION

Figure 1:
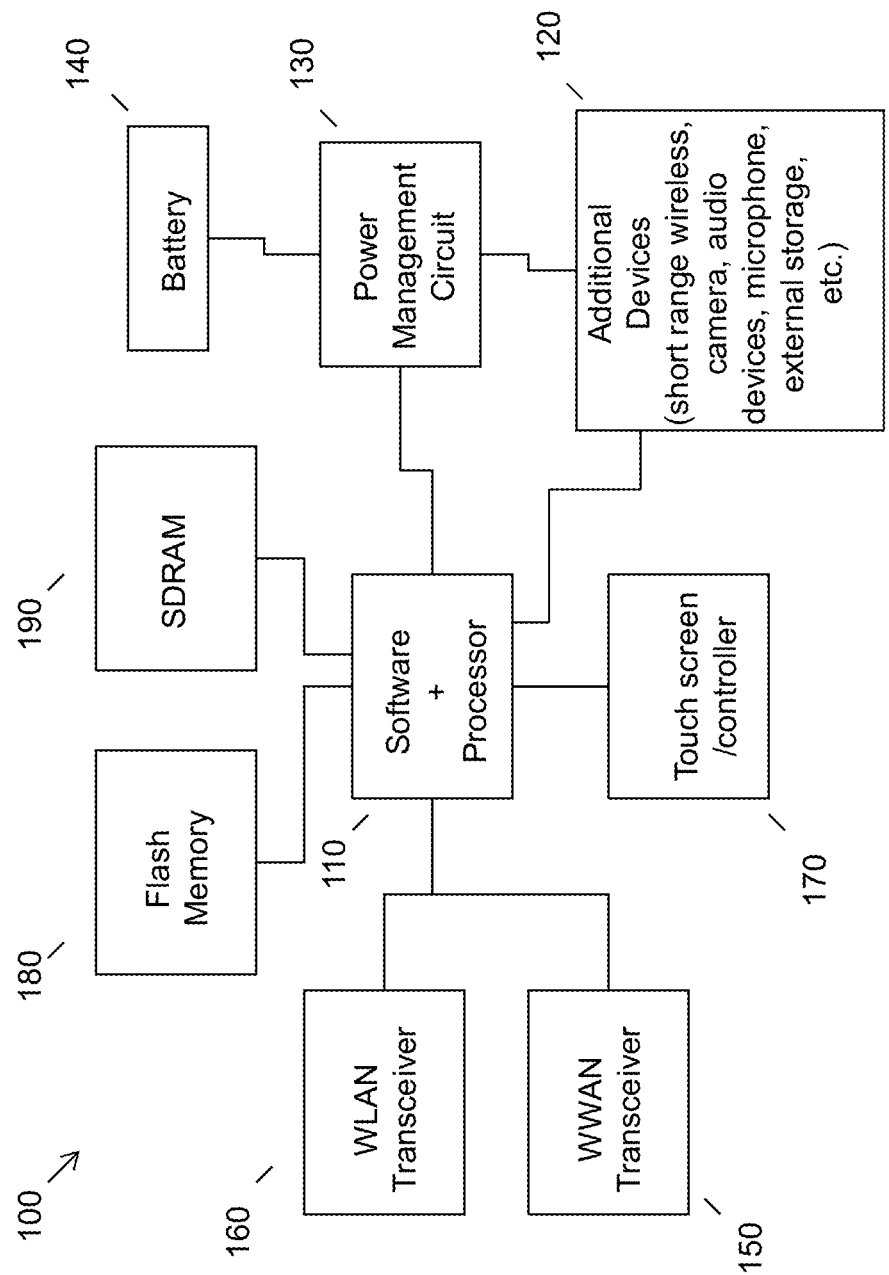
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Typically, in order to classify a document into a particular document type (e.g., email, letter, technical document, form, etc.), the text or content within a document is reviewed and analyzed. While this process can be performed manually, many computer-implemented methods are utilized to assist in the content identification. For example, a system may use text analysis techniques, natural language processing techniques, information extraction techniques, and the like, to extract information regarding the content of a document and that allows the system to automatically classify the document based upon the content of the document. The system uses the identified and/or extracted content to compare the content to content of known documents types. This comparison may be performed using simple comparison techniques or more complex comparison techniques, for example, machine-learning models, unsupervised learning methods, or the like. However, content analysis is very time and resource intensive. Thus, a content analysis to classify documents into a particular document type requires many processing resources and time as compared to simpler analysis techniques.

Accordingly, the described system provides a method for clustering documents into document clusters based upon a structure of the document as identified by converting the document into character representations and producing arrays for the documents. In other words, the described system, instead of performing a content analysis like traditional document classification systems, classifies documents based upon a structure of the document. The system may train a machine-learning model to classify documents into different document types based upon the format or structure of an input document. To train the machine-learning model or to classify a new document the system may convert an input document (e.g., new document, document for training, etc.) into character representations. The character representations may be numbers, symbols, letters, or the like. The system then produces an array from the character representations representing the format or structure of the document. In other words, the system may produce an array representing a document structure and consisting of character representations.

After producing the array, the system can cluster the document into a document cluster. In the training stage, a plurality of documents are clustered and classified into document clusters to generate the document clusters that can be used for training the machine-learning model. In the implementation stage when a new document is being classified, the document is classified into an existing document cluster using the trained machine-learning model. Within the clusters are documents having similar structures. The similar structures are determined by grouping the arrays into groups of arrays having similarities. The documents that correspond to the arrays within a group are considered similar and placed into the document cluster. In other words, the document clusters include documents having similar structures as determined by grouping the arrays based upon similarities between the arrays and corresponding to the documents.

Therefore, a system provides a technical improvement over traditional methods for classifying a document type by determining the document type of a received document without needing a detailed analysis of the document content. The analysis of the documents based upon the format or structure of the document is a less complex analysis than a document content analysis technique. Thus, the described system provides a technique for classifying documents that is less resource and time intensive than document classification using traditional techniques. Speeding up the document classification analysis allows for quicker document analysis, thereby allowing the system to classify more documents in a particular period of time which is particularly useful in certain applications.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and SDRAM 190.

Figure 2:
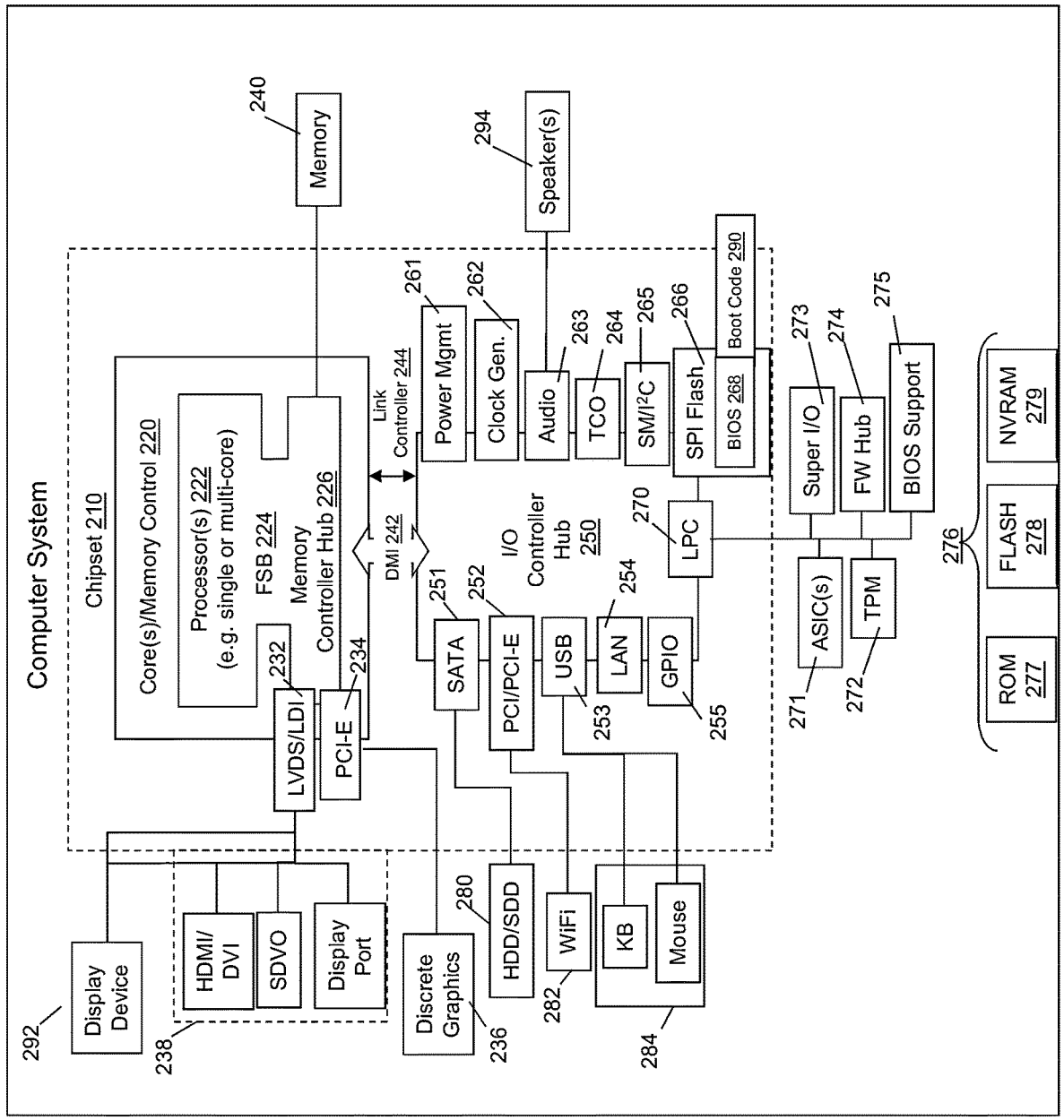
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in document classification. For example, the circuitry outlined in FIG. 1 may be implemented in a tablet or smart phone embodiment, whereas the circuitry outlined in FIG. 2 may be implemented in a personal computer embodiment.

Figure 3:
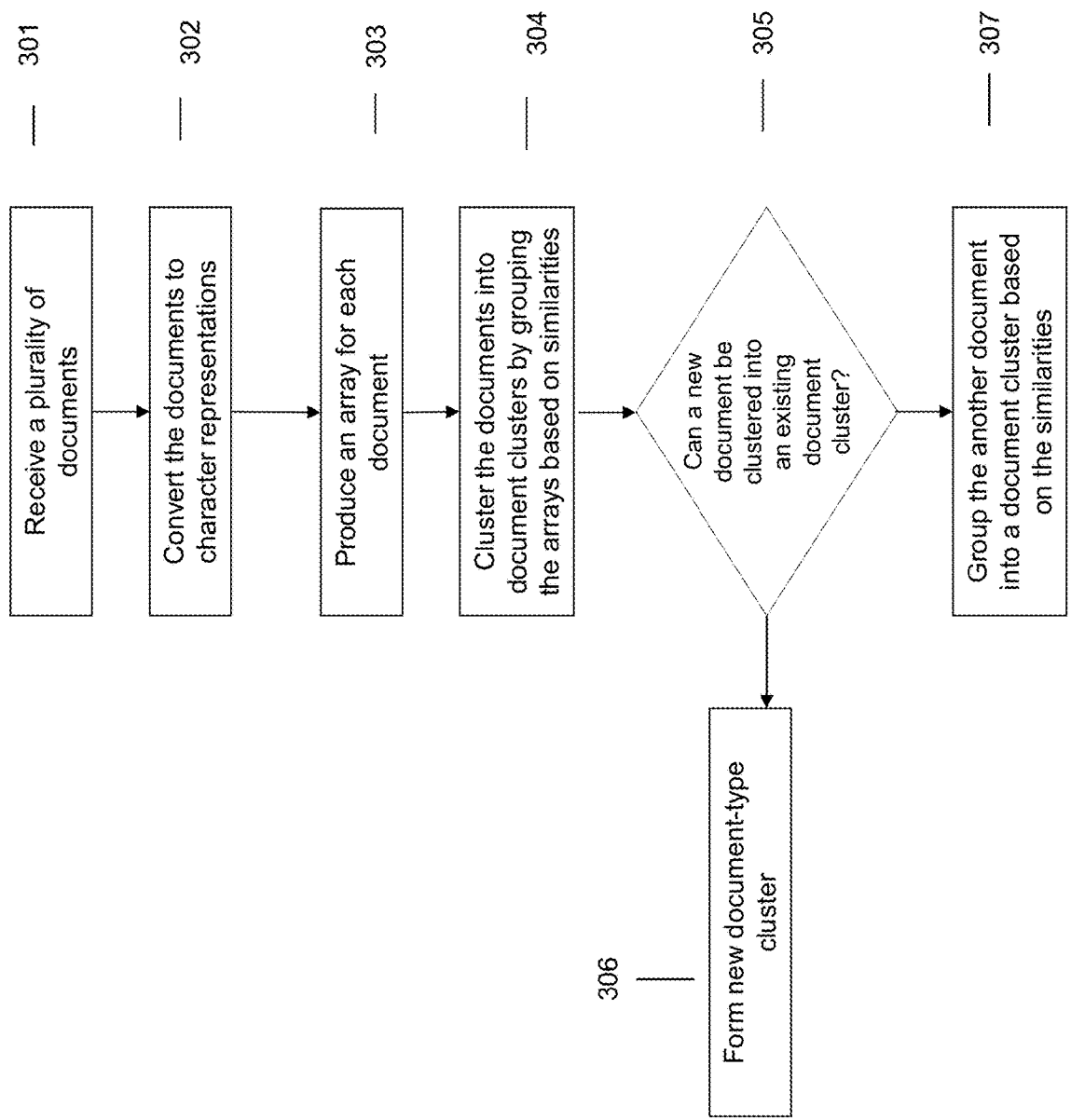
FIG. 3 illustrates an example method of clustering documents into document clusters based upon a structure of the document as identified by converting the document into character representations and producing arrays for the documents.

Referring to FIG. 3, a method for clustering documents into document clusters based upon a structure of the document as identified by converting the document into character representations and producing arrays for the documents is illustrated. The described system may have two phases, a training phase and an implementation phase. During the training phase, the system may undergo the process of training a machine-learning model in order to identify a document type and subsequently create document clusters that have documents having similarities. During the implementation phase, using the trained machine-learning model, the system may receive a new document and determine the document type of the new document without analyzing the content of the document.

A system may receive one or more documents at 301. The received one or more documents each contain a plurality of characters (e.g., symbols, images, numbers, letters, special characters, etc.). The document(s) have a structure or format. The structure or format describes the shape or look of the document(s). For example, a business letter may have a format which includes a particular location for certain information, a particular spacing between lines and/or paragraphs, and the like. The business letter may have a different format than a technical document. Thus, the structure or format includes spacing of the document content, information placement within the document, particular information included within the document, and the like.

In the training phase of the described technique, the received documents may have a known document type. For example, the documents may be labeled or annotated with the document type. The documents may be previously labeled by a user, using conventional document classification techniques, or the like. The use of known document types may assist in training the system prior to relying on system to classify a document with an unknown document type. In the implementation phase, the document received, referred to as a new document for ease of readability, is unlabeled and has an unknown document type. Receipt of the one or more documents may include a user inputting one or more documents into the system via uploading the document into the system. Receipt of the one or more documents may include retrieving a file from an Internet source, a database, a data storage location, or other system accessible location.

After receiving one or more documents at the system, each document may undergo a converting process that converts each of the characters within the document(s) to a character representation at 302. The system may have a set of predefined character representations and each character within the document is converted to the character representation corresponding to the character. The character representations may be numbers, letters, alphanumeric characters, symbols, or the like. For ease of readability the example used throughout this disclosure will be numeric representations, but this is not intended to limit this disclosure to numeric representations. Thus, each number may be assigned to a particular attribute of a character. Any characters having that attribute will be converted to the number assigned to the attribute. In other words, many different characters may be converted to the same number since the content or the particular character does not define the character representation, but rather the character attributes define the character representations. Thus, converting the characters may include identifying an attribute of the character and selecting the character representation corresponding to the attribute. Some attributes of the characters include an uppercase character, a lowercase character, a special character, a white space character, and the like.

FIG. 4A and FIG. 4B illustrate an example conversion. When converting the document to numeric characters, a system may generate a numeric character for each character and space, as mentioned previously. FIG. 4A illustrates an example document that was received. FIG. 4B illustrates the conversion of the document of FIG. 4A into numeric representations. In this example, the numeric representation of "2" corresponds to an uppercase character attribute, "1" corresponds to a lowercase character attribute, "3" corresponds to a special character, and "0" corresponds to a white space character. As noted above, since the content or particular character does not define the character representation that is used, multiple uppercase letters in FIG. 4A are all converted to the numeric representation "2". The definition of character attributes to character representations may be set by a user, may be default values, or the like. Additionally, the definition of character attributes to character representations may be different for different applications, different users, or the like.

As indicated above, other numbers may correspond to the character attributes, different character representations may correspond to the character attributes, or the like. For example, if the system recognizes that the first word in the first sentence of a document is an uppercase letter, an algorithm may assign the uppercase letter a numeric character of "2" regardless of the actual letter. Thus, the content of the underlying character is not important. Rather, the type or attribute of the character is the information which is used for the conversion. For example, a "C" and a "V" may both be given a numeric character of "2" since both are uppercase letters. Further, any lowercase letters in the document, may be assigned a numeric character of "1" regardless of the actual letter. Further explaining this example, a special character (e.g., comma, parentheses, punctuation mark, symbol, etc.) within the document may be assigned a numeric character of "3". Further, numbers in the document may be assigned a numeric character of "4".

Further, white spaces may also be assigned a numeric character, for example, "0". Each white space, whether they are spaces between words, indentations, line spacing, or any other space not occupied by a character, for example, lowercase letter, uppercase letter, special character, number, and the like, may still be converted to a numeric character indicating the lack of a text-based character at a location in the document. Other character attributes may be defined and correspond to character representations. For example, in some languages, letters may include special marks or accents, for example, umlaut, ring, grave, or other diacritical marks. These character attributes may be assigned to their own character representation. Alternatively, they may be defined within the broader character attributes. For example, an uppercase letter having a diacritical mark may be assigned to the character representation corresponding to uppercase letters, thereby effectively ignoring the diacritical mark for format purposes. Additionally, the described groupings may be further refined with the more refined groupings each having a corresponding character representation. For example, the special character grouping may be broken into punctuation marks and symbol groupings, with each having a different character representation.

Subsequent to converting the document to character representations, the system may produce an array for each document from the character representations at 303. As illustrated in FIG. 4A and FIG. 4B, the resulting conversion of the characters of the document results in a matrix-like or array structure for the document, thereby allowing the system to produce an array for the document. When producing the array, the size of the array may be configurable. For example, the width of the array may be equal to the width of the longest line in the document, or it may be a set width. Any lines not equal to the width of the array will result in the system filling in the unoccupied character locations with a character representation corresponding to white space characters, "0" using the example defined above.

In an embodiment, when converting the document into character representations, the raw documents (those that have not undergone the conversion) may be converted into a square-shaped image or matrix. Defining the arrays to have a particular size and/or shape allows the system to set a parameter space for implementing the system. In other words, the algorithm may establish the parameters for converting the document in order to produce the array. By setting a particular array size or array size range, the system may establish a minimum and/or maximum number of characters for the array, a minimum and/or maximum number of characters for lines within the array, a minimum/maximum number of lines in the array, and/or the like. For example, the system may establish that the array needs to have 5000 characters. If the document does not include 5000 characters, the system may fill in any missing characters with the white space character representation. If the document includes more than 5000 characters, the document may be broken into multiple arrays.

An example technique for converting a raw document into an array follows. After establishing a maximum character length for a matrix, the system may utilize a line-based padding method to split the text within each document by line breaks. Each line is then padded with white space characters to fit within the array dimensions. Thus, the padded whitespace may be based upon the size of the square image or matrix. Thereafter, the padded lines are re-joined into one text string. The system then uses an encoding scheme, referred to as character-level encoding, to convert each character, including the padded white space characters, into a character representation based upon the attribute of the character.

In one non-limiting example embodiment, when converting the text-based format to character representations, and determining a matrix size, the system may utilize a perfect square conversion method. The perfect square conversion method pads the incoming document string or numeric characters to the nearest perfect square length. For example, if the string has 5000 characters, the padded length is 5041 which equals $71^2$. It should be noted that the nearest perfect square length may be a number less than the number of characters in the string. To make the document string fit within the perfect square length, the system may reshape the encoded numeric character array into the square shaped method with the determined size (71 wide×71 rows, in this example). This reshaping may obviate the need for padding empty lines with in the document, thereby preserving the textual information. However, this perfect square conversion method is dependent on the size of the original document when determining the array parameters, thereby resulting in the parameters not being fixed or the same across all documents. Thus, padding some matrices to match larger matrices may be necessary when attempting to obtain consistent parameter values.

Using the reshaping method, the list of numbers or the matrix may be reshaped into an array falling within an established parameter value. As indicated above, not all documents may fit within the desired parameter. Thus, during the reshaping characters may be added or removed depending on the size of the string with respect the desired parameter value. For example, if the number of the rows of the document are less than the parameter value, the system may pad the rows with zero vectors until reaching the parameter value. If, on the other hand, the number of rows exceeds the parameter value a system may utilize a method to reduce the number of rows until the rows match the parameter value.

One technique for reducing the number of rows is a cut method that simply remove rows beyond the determined parameter value. Another technique for reducing the number of rows is a mean method which may average batches of data and utilize the batch number. Multiple batches may be present across a matrix that comprises a value of rows greater than the parameter value. The rows within the matrix are padded to be an integer multiple of the parameter value. For example, if the parameter value is 100, the rows are padded until they reach a multiple of 100 (e.g., 200 rows, 300 rows, etc.). Thereafter, the matrix is separated into batches having a number of rows consistent with the parameter value. Using the example, the matrix would be separated into batches of 100 rows. The value of each of batch is then averaged and kept in the final array. Thus, the final array accounts for the entire document, even those document values that may fall outside the parameter value.

Another technique includes using a conv1d-linear method. In this technique, the array may be padded as described with respect to the mean method, and then convoluted with a uniform vector size. As one example, the uniform vector size may be described as size=2m+1, where m is the number of rows divided by the parameter value; resulting in a stride value equaling 1. Then, every mth row of the convoluted array is kept in the final array. Another technique includes using a conv1d-gaussian method. Similar to the methods utilized in the conv1d-linear, conv1d-gaussian utilizes the mean method with a convoluted weight vector; however, the weight vector in the conv1d-gaussian is in a Gaussian shape rather than linear as with the conv1d-linear method.

As a result of reshaping the square image or matrix, in an embodiment, the array is produced consistent with the parameter values to produce a perfect square matrix. Additionally, in the embodiment, the matrix is then normalized to ensure the values within the matrix are in [0, 1] values and the whole matrix is repeated three times into a shape having a third dimension. For example, if the shape of the matrix is (100, 100), then the repeated matrix may be presented as (3, 100, 100).

Figure 5:
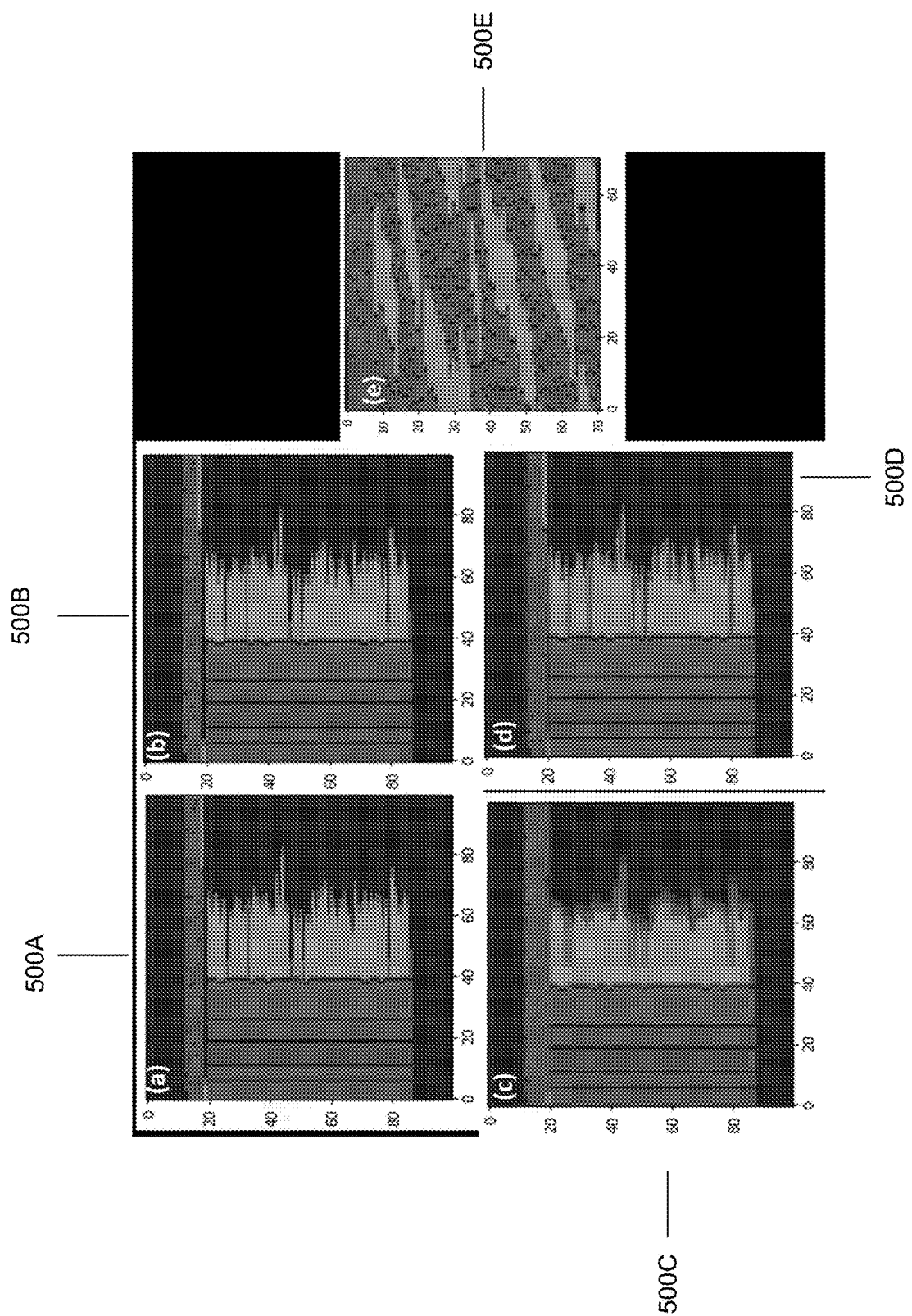
FIG. 5 illustrates example imagery of reshaping methods that may be used within the system when producing the array for the document and determining a document type.

FIG. 5 provides sample images resulting from various reshaping methods in order to produce an array. The arrays are represented by images using computer vision methods. Thus, 500*a* depicts a cut reshaping method, 500*b* depicts a mean reshaping method, 500*c* depicts a conv1d-linear reshaping method, 500*d* depicts a conv1d-gaussian reshaping method, and 500*e* depicts a perfect square reshaping method. 500*a*, 500*b*, 500*c*, 500*d*, and 500*e* are all performed using parameters of (100, 100), whereas 500*e* is performed using the parameters (71, 71). As can be seen in images 500*a*-500*d*, the images result in similar graphics. This indicates that all the reshaping methods result in similar results. 500*e* is different, but this is because of the different parameter values due to the use of the perfect square reshaping method.

Once the arrays are produced, the system may cluster the documents into document clusters at 304. In the training phase, the clustering produces the document clusters for training the machine-learning model for classifying documents into document clusters. In the implementation phase, the clustering classifies the new document into one of the predefined document clusters. The clustering groups documents having similar structures into document clusters that correspond to a document type. Thus, once a document is clustered into a document cluster, the system can determine the type of the document since the document clusters correspond to a particular document type. To cluster the documents, the system groups the arrays into groups of arrays having similarities. Since the arrays correspond to a particular document, once the arrays are grouped, the corresponding documents can be clustered or grouped. In other words, the documents are clustered based upon the grouping of the array corresponding to the document.

One technique for grouping the array into an array grouping based on similarities, an embodiment may utilize a KMeans clustering methodology. The KMeans clustering methodology may be utilized to cluster features of the vectors present within a matrix based upon determined similarities. KMeans clustering may work with and/or alongside a convolutional neural network (CNN) when determining relevance of a vector in comparison to other vectors within the same matrix, and may also have the ability to differentiate between different vectors being weighed. Further, the CNN may assign an importance score based upon a weight of the vector present in the matrix. The KMeans clustering method used may utilize cluster centers to model data, which is similar to a Gaussian Mixture model (GMM). GMM data may be used alongside KMeans methodology to assist in determining a vector value based on the use of cluster centers. However, the KMeans model may be weighted to have more influence on a system since a KMeans method concentrates on clustering vectors within a matrix based upon comparable spatial extent. The GMM, on the other hand, allows the clustering to occur when matrices have different shapes. Thus, the KMeans method permits a system to group the array into a document cluster based on similarities while maintaining a size across each array.

It should be noted that the described clustering technique can be used in conjunction with other clustering techniques. Other clustering techniques may include natural language clustering techniques, semantic analysis techniques, or other content analysis techniques. These clustering techniques may be used in parallel with or in conjunction with the described clustering technique. Thus, the additional clustering techniques may be used to refine the clusters of the described clustering technique, or the described clustering technique could be used to refine clusters from other clustering techniques. Alternatively, the clustering techniques can be used in parallel to generate more document clusters.

To ensure that the clustering is of a high quality and accurately depicts an array based on similarities, an embodiment may employ the use of a silhouette score (SS). An SS may provide a metric identifying the quality of the clustering performed in conjunction with the reshaping methods previously discussed. In an embodiment, in combination with the CNN and an evaluation method utilized across the network, the clustering algorithm may generate clusters with a high SS. Other evaluation methods, such as entropy ratio (ER) and normalized mutual information (NMI) may produce usable quality values; however, the SS evaluation may provide an optimal number of clusters and is also sensitive to the metrics involved. It may be helpful to run a detailed analysis of clusters generated by different models or reshaping methods in order to determine the cluster and method with the highest quality score; thus, ensuring that the determination of a document type of a document is performed with a high degree of confidence.

In the training phase, the document clusters can be used to train a machine-learning model for classifying documents. The machine-learning model ingests the document clusters and uses these to learn what document formats result in a particular document type corresponding to a document cluster. The machine-learning model can then be used to classify new documents that have not previously been seen by the machine-learning model. As new documents are received and classified, the machine-learning model gets further refined and more accurate.

Thus, in the implementation phase, the trained machine-learning model may be used to perform the classification. In the implementation phase, the documents are converted to character representations and arrays are produced as described in connection with steps 302 and 303. The machine-learning model may recognize similarities between the array(s) of the new document and the arrays in the established clusters. Thus, the system can determine if a new document can be clustered into an existing document cluster at 305. If the system determines that the new document, which has since been converted into an array consisting of numeric characters, does indeed contain similarities to a cluster, an embodiment may group the new document into the identified document cluster based on the similarities at 307. If, on the other hand, it is determined that the new document does not contain one or more similarities at 305, a system may form a new document type cluster at 306.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for clustering documents based upon a structure of each of the documents, comprising:
   receiving, at a device utilizing a machine-learning model, at least one document, each comprising a plurality of characters and having a structure;
   converting, by the machine-learning model, for each of the at least one document, each of the plurality of characters to one of a plurality of character representations, wherein the converting comprises identifying an attribute of a character and selecting a character representation corresponding to the attribute, wherein the attribute identifies a type of the character and wherein characters having a same type are represented by a same character representation irrespective of a content of the character;
   producing, by the machine-learning model, at least one array for each of the at least one document, wherein the at least one array comprises the plurality of characters converted to the character representations, wherein the at least one array represents the structure of the at least one document; and
   clustering, by the machine-learning model, the at least one document into document clusters having similar structures by grouping the at least one array into groups of arrays having similarities, wherein each document cluster comprise documents corresponding to the at least one array within one of the groups of arrays.

2. The method of claim 1, comprising training, on arrays corresponding to the document clusters, the machine-learning model for classifying documents.

3. The method of claim 2, comprising receiving a new document, converting the new document into character representations, producing at least one array for the new document, and classifying, using the machine-learning model on the at least one array for the new document, the new document into one of the document clusters.

4. The method of claim 1, wherein the producing at least one array comprises utilizing a reshaping method.

5. The method of claim 1, wherein the clustering comprises clustering, utilizing a KMeans methodology, one or more similar vectors within the at least one array of the at least one document.

6. The method of claim 1, wherein the grouping the at least one array comprises extracting features from the at least one array and grouping, using at least one unsupervised clustering method, arrays having similar arrays.

7. The method of claim 1, wherein the at least one array is represented by images.

8. The method of claim 1, comprising utilizing the clustering in conjunction with at least one other clustering technique to refine the document clusters.

9. The method of claim 1, wherein the character representation comprises a numeric representation, wherein each character attribute corresponds to a predetermined numeric representation.

10. The method of claim 1, wherein the attribute of a character is selected from a group consisting of: white space, uppercase character, lowercase character, and special character.

11. An information handling device for clustering documents based upon a structure of each of the documents, comprising: a processor; a memory device that stores instructions executable by the processor to:
  receive, at a device utilizing a machine-learning model, at least one document, each comprising a plurality of characters and having a structure;
  convert, by the machine-learning model, for each of the at least one document, each of the plurality of characters to one of a plurality of character representations, wherein the converting comprises identifying an attribute of a character and selecting a character representation corresponding to the attribute, wherein the attribute identifies a type of the character and wherein characters having a same type are represented by a same character representation irrespective of a content of the character;
  produce, by the machine-learning model, at least one array for each of the at least one document, wherein the at least one array comprises the plurality of characters converted to the character representations, wherein the at least one array represents the structure of the at least one document; and
  cluster, by the machine-learning model, the at least one document into document clusters having similar structures by grouping the at least one array into groups of arrays having similarities, wherein each document cluster comprise documents corresponding to the at least one array within one of the groups of arrays.

12. The information handling device of claim 11, comprising training, on arrays corresponding to the document clusters, the machine-learning model for classifying documents.

13. The information handling device of claim 12, comprising receiving a new document, converting the new document into character representations, producing at least one array for the new document, and classifying, using the machine-learning model on the at least one array for the new document, the new document into one of the document clusters.

14. The information handling device of claim 11, wherein the producing at least one array comprises utilizing a reshaping method.

15. The information handling device of claim 11, wherein the clustering comprises clustering, utilizing a KMeans methodology, one or more similar vectors within the at least one array of the at least one document.

16. The information handling device of claim 11, wherein the grouping the at least one array comprises extracting features from the at least one array and grouping, using at least one unsupervised clustering method, arrays having similar arrays.

17. The information handling device of claim 11, wherein the at least one array is represented by images.

18. The information handling device of claim 11, comprising utilizing the clustering in conjunction with at least one other clustering technique to refine the document clusters.

19. The information handling device of claim 11, wherein the character representation comprises a numeric representation, wherein each character attribute corresponds to a predetermined numeric representation.

20. A product for clustering documents based upon a structure of each of the documents, comprising:
  a storage device having code stored within, the code being executable by a processor and comprising:
  code that receives, at a device utilizing a machine-learning model, at least one document, each comprising a plurality of characters and having a structure;
  code that converts, by the machine-learning model, for each of the at least one document, each of the plurality of characters to one of a plurality of character representations, wherein the converting comprises identifying an attribute of a character and selecting a character representation corresponding to the attribute, wherein the attribute identifies a type of the character and wherein characters having a same type are represented by a same character representation irrespective of a content of the character;
  code that produces, by the machine-learning model, at least one array for each of the at least one document, wherein the at least one array comprises the plurality of characters converted to the character representations, wherein the at least one array represents the structure of the at least one document; and
  code that clusters, by the machine-learning model, the at least one document into document clusters having similar structures by grouping the at least one array into groups of arrays having similarities, wherein each document cluster comprise documents corresponding to the at least one array within one of the groups of arrays.

* * * * *